United States Patent
Yuan et al.

(10) Patent No.: US 9,725,890 B2
(45) Date of Patent: Aug. 8, 2017

(54) JET SHOWER DEVICE

(71) Applicant: GUANGZHOU SEAGULL KITCHEN AND BATH PRODUCTS CO., LTD., Guangzhou, Guangdong (CN)

(72) Inventors: Xunping Yuan, Guangdong (CN); Zhiqiang Tang, Guangdong (CN); Xianxin Mai, Guangdong (CN)

(73) Assignee: GUANGZHOU SEAGULL KITCHEN AND BATH PRODUCTS CO., LTD., Guangdong (CN)

( * ) Notice: Subject to any disclaimer, the term of this patent is extended or adjusted under 35 U.S.C. 154(b) by 127 days.

(21) Appl. No.: 14/419,199

(22) PCT Filed: Sep. 26, 2013

(86) PCT No.: PCT/CN2013/084285
§ 371 (c)(1),
(2) Date: Feb. 2, 2015

(87) PCT Pub. No.: WO2014/173073
PCT Pub. Date: Oct. 30, 2014

(65) Prior Publication Data
US 2015/0204056 A1 Jul. 23, 2015

(30) Foreign Application Priority Data

Apr. 27, 2013 (CN) .......................... 2013 1 0154267

(51) Int. Cl.
*E03C 1/02* (2006.01)
*F16K 11/044* (2006.01)
(Continued)

(52) U.S. Cl.
CPC .............. *E03C 1/025* (2013.01); *B05B 1/185* (2013.01); *F16K 11/00* (2013.01); *F16K 11/044* (2013.01); *F16K 11/207* (2013.01)

(58) Field of Classification Search
CPC . B05B 7/0408; B05B 12/1418; B05B 12/002; B05B 7/12; B05B 7/2497;
(Continued)

(56) References Cited

U.S. PATENT DOCUMENTS 6,089,462 A * 7/2000 Osvaldo ............. G05D 23/1346
236/12.2
6,454,175 B1 * 9/2002 Lorch ................ G05D 23/1353
137/625.41
(Continued)

FOREIGN PATENT DOCUMENTS

CN 2221762 3/1996
CN 201007372 Y 1/2008
(Continued)

OTHER PUBLICATIONS

International Preliminary Report on Patentability dated Apr. 28, 2015 in corresponding International application No. PCT/CN2013/084285 (w/translation) (15 pages).
(Continued)

*Primary Examiner* — Arthur O Hall
*Assistant Examiner* — Adam J Rogers
(74) *Attorney, Agent, or Firm* — Osha Liang LLP

(57) ABSTRACT

A shower jet device, includes a spray needle arranged in a spray nozzle; a cold water inflow space and a cold water jet outlet formed between the spray nozzle and the spray needle; a hot water inflow space formed between the spray nozzle and a valve body; wherein a cold water inlet respectively in communication with a cold water opening and the cold water inflow space; and a hot water inlet is respectively
(Continued)

in communication with a hot water opening and the hot water space.

20 Claims, 8 Drawing Sheets

(51) Int. Cl.
*B05B 1/18* (2006.01)
*F16K 11/00* (2006.01)
*F16K 11/20* (2006.01)

(58) Field of Classification Search
CPC ......... Y10T 137/6416; Y10T 137/0324; Y10T 137/7922; Y10T 137/7925; F16K 49/00
USPC ..................................................... 239/417.5
See application file for complete search history.

(56) References Cited

U.S. PATENT DOCUMENTS

| | | | | |
|---|---|---|---|---|
| 2003/0155427 | A1* | 8/2003 | Eveleigh | G05D 23/134 236/12.14 |
| 2004/0194825 | A1* | 10/2004 | Kempf | E03B 1/048 137/337 |
| 2010/0123014 | A1* | 5/2010 | Beagen | G05D 23/1346 236/12.2 |

FOREIGN PATENT DOCUMENTS

| | | |
|---|---|---|
| CN | 102086941 A | 6/2011 |
| CN | 202302110 U | 7/2012 |
| CN | 202328790 U | 7/2012 |
| CN | 103016421 A | 4/2013 |
| CN | 203209229 U | 9/2013 |
| CN | 203214940 U | 9/2013 |
| CN | 203214955 U | 9/2013 |
| CN | 203214961 U | 9/2013 |
| CN | 203230878 U | 10/2013 |
| EP | 0390121 A1 | 10/1990 |
| JP | 2001263511 A | 9/2001 |

OTHER PUBLICATIONS

International Search Report dated Feb. 20, 2014 in corresponding International application No. PCT/CN2013/084285 (4 pages).
Office Action issued in Chinese Application No. 201310154267.1; Dated Jul. 3, 2014, with English Translation (11 pages).
Office Action issued in Chinese Application No. 201310154267.1; Dated Nov. 4, 2014, with English Translation (7 pages).
Office Action issued in Chinese Application No. 201310154267.1; Dated Jan. 30, 2015, with English Translation (4 pages).

* cited by examiner

JET SHOWER DEVICE

CROSS REFERENCE TO RELATED APPLICATIONS

This is a national stage application based on PCT/CN2013/084285, filed on Sep. 26, 2013, which claims priority to Chinese Patent Application No. CN 201310154267.1, filed on Apr. 27, 2013. This application claims the benefits and priority of these prior applications and incorporates their disclosures by reference in their entireties.

TECHNICAL FIELD

The present invention relates to a jet shower device, and especially relates to a jet shower device used in a water supply system of a solar water heater, which belongs to the technical field of solar water heaters.

BACKGROUND TECHNOLOGY

The solar water heaters of the prior art mainly include the pressure-bearing type and the non-pressure-bearing type.

The operating principle of the pressure-bearing type of solar water heaters is that: tap water flows into the water tank and the heat pipe through a control switch, the heat collecting tube absorbs solar radiation and then transmits thermal energy to the cold water in the heat pipe, so as to circularly heat the water in the water tank, however, as the water tank is an enclosed construction as a whole, during usage it is necessary to open the cold water inlet and utilize the water pressure of the tap water to push out the hot water of the water tank, so as to allow hot water to flow into the water using unit through the water outlet. The water tank of this structure type bears pressure from tap water, has relatively larger water outflow rate and better usage comfort level, however, the water tank of this structure type is required to bear water pressure of up to 7 MPa, in addition, a heat pipe structure needs to be further provided inside the tank, and there are also requirements for relatively high sealing effect, and relatively thicker material, thus causes relatively higher cost of the solar water heater.

The operating principle of the non-pressure-bearing type of solar water heaters is that: tap water flows into the water inflow and outflow port (water baffle board) of the water tank, until the water tank and the glass heat pipe are filled, the glass heat pipe absorbs sunlight and then heat the water in the water tank and the glass heat pipe, and after being heated, the water of the water tank flows to the indoor water using unit through the water inflow and outflow port for the users to use. The water tank and the glass heat pipe of this structure type only bear water pressure generated corresponding to the height of the water tank, which is relatively small pressure, therefore, the glass heat pipe and the water tank are not required to have pressure-proof designs, thus save material and reduce cost relative to the pressure-bearing type of solar water heater. However, because the mounting height of the water tank is limited by the architectural structure, it is generally difficult for the solar water heater of this type of structure to provide relatively higher water pressure to the water outflow unit, which results in relatively smaller water outflow rate of the water outflow unit and negatively affects the usage comfort level.

Chinese patent literature under CN103016421A disclosed a jet device and a water heater valve having the jet device, which belongs to the non-pressure-bearing type of water heater valve, wherein, the effects of jetting pressurizing and reducing cost are simultaneously achieved through reasonable configuration of the jetting pressurizing structure. However, for the water heater valve disclosed in this patent literature, the opening diameter of its nozzle is constant, and when adjusting inflow rates of cold water and hot water respectively through the cold water flow rate regulating switch and the hot water flow rate regulating switch, if the opening size of the cold water flow rate regulating switch is adjusted to be smaller than the opening size of the nozzle, then the pressure of the working fluid inside the nozzle will be reduced, so as to reduce the jet velocity of the working fluid of cold water, thereby causing weaker effect of hot water pumping, which leads to lower usage comfort level when used in summer.

Chinese patent literature under CN102086941B disclosed a water mixing valve, comprising a valve body, wherein, a valve cold water inlet, a valve hot water inlet, a valve water outlet, and a nozzle connected to the valve cold water inlet are provided on the valve body, a nozzle cold water inlet and a nozzle cold water outlet are provided on the nozzle, a hot water adjusting cavity communicated with the valve hot water inlet and a water mixing cavity communicated with the valve water outlet are also provided inside the valve body, the water mixing cavity and the hot water adjusting cavity are interconnected through a valve hot water outlet positioned at one end of the hot water adjusting cavity, and the water mixing cavity is also communicated with the nozzle through the nozzle cold water outlet. When flow rate of hot water needs to be adjusted, the nozzle can be screwed into or out of the valve body, so as to increase or decrease the cross-sectional area of the inlet of hot water, and at the same time, the cross-sectional area of the inlet of cold water is also increased or decreased, as a result, the mixing proportion of cold water and hot water is adjusted. However, it has the following defects during usage:

When the nozzle is rotated, the needle valve moves with the nozzle, and during this process, there is no relative motion occurred between the nozzle and the needle valve, so that the cross-sectional area of the outlet of cold water is always kept constant, as a result, when the cross-sectional area of the inlet of cold water is smaller than the cross-sectional area of the outlet of cold water, the water pressure of cold water inside the nozzle will be very low, and it will be difficult to achieve better jetting effect, and that, in order to ensure better jetting effect, the needle valve needs to be adjusted at the same time, so as to decrease the cross-sectional area of the outlet of cold water, which requires simultaneous adjustment of the needle valve and the nozzle with increased difficulty of usage, and if the needle valve and the nozzle are not adjusted at the same time, then it is difficult to ensure better water out flowing effect and higher usage comfort level.

It can be understood from the preceding discussion that, how to improve the water mixing valve in order to simultaneously achieve higher usage comfort level, lower usage cost and more convenient operation is a technical problem that is unsolved in the prior art.

SUMMARY OF THE INVENTION

Therefore, the technical problem to be solved in the present invention is how to provide a jet shower device with higher usage comfort level, lower usage cost and operation convenience.

For this purpose, the present invention provides a jet shower device, comprising: a water mixer body, having a cold water port, a hot water port and a mixed water outlet; a jet injection valve, having a valve body with a cold water inlet and a hot water inlet formed thereon and with a nozzle and a needle disposed therein, and further having a jetting cold water outlet and a cold water inflow space both formed between the nozzle and the needle, a hot water inflow space formed between the nozzle and the valve body, and a water outlet; and a shower assembly, having a pipeline communicated with the mixed water outlet of the water mixer body, and a sprinkler head communicated to the pipeline; wherein, opening dimensions of the cold water port and the hot water port are adjustable through a double-linkage control valve; the needle is mounted inside the nozzle, the cold water inlet is communicated with the cold water port and the cold water inflow space respectively, the hot water inlet is communicated with the hot water port and the hot water inflow space respectively; the needle is unmovable in the axial direction of the jet injection valve, while the nozzle is movable along the axial direction of the jet injection valve; and the cold water inflow space, the hot water inflow space and the jetting cold water outlet are simultaneously adjustable by adjusting the position of the nozzle in the axial direction.

The jet shower device of the present invention further comprises a rotatable member rotatably disposed on the valve body in a sealing manner, and an axial movement adjusting means forming an axial movable adaptation with the nozzle and allowing a rotating movement of the rotatable member to be converted into an axial movement of the nozzle.

The rotatable member is connected with the needle to drive the needle to rotate therewith; the valve body coordinates with the nozzle through a rotation limiting part, so as to prevent the nozzle from rotating relative to the valve body as the rotatable member drives the needle to rotate, and via the axial movement adjusting means to allow the nozzle to move in the axial direction of the needle relative to the valve body.

The water outlet of the valve body is communicated with a throat tube, the throat tube is communicated with a smaller open end of an expansion tube with variable diameters, the expansion tube is communicated with the pipeline.

The internal diameter of the throat tube is 5~14 mm, the length of the throat tube is within 5~8 times its internal diameter.

The internal diameter of the throat tube is 6~10 mm.

An expansion angle formed by extension lines of an outer wall of the expansion tube and an outer wall of the throat tube is 5°~15°.

The axial movement adjusting means comprises an internal thread formed on the nozzle, and an external thread formed on the rotatable member and engaged with the internal thread, wherein, the stroke length of the screw-thread fit of the internal thread and the external thread is larger than or equal to the distance from the jetting cold water outlet of the nozzle to the throat tube.

The rotation limiting part comprises a polygonal end portion formed on the nozzle, and the shape of the internal wall of the valve body matches with that of the polygonal end portion.

The nozzle has a nozzle conical portion, and a smaller open end of the nozzle conical portion forms the jetting cold water outlet.

The needle has a needle body and a needle conical portion formed on one end portion of the needle body, wherein, the larger end of the needle conical portion is connected on the needle body.

The conical angle of the needle conical portion is 10°~150°.

The conical angle of the nozzle conical portion is larger than or equal to that of the needle conical portion A supporting member is arranged circumferentially around the needle body, the supporting member coordinates with an internal wall of the nozzle so as to support the needle through the nozzle, and a fluid passage is formed on the supporting member.

The supporting member comprises a plurality of convex ribs evenly arranged circumferentially around the needle body and extending in its axial direction, each two adjacent convex ribs have one the fluid passage formed therebetween, and the sum of the cross-sectional areas of the fluid passages is larger than the jetting cross-sectional area of the nozzle cold water outlet.

Each convex rib comprises a first portion and a second portion, and the first portion is arranged towards a nozzle cold water inlet of the nozzle, and its radial dimension is smaller than the radial dimension of the second portion, so as to form the fluid passage by coordinating with an internal cavity wall of the nozzle, and an external surface of the second portion coordinates with the internal cavity of the nozzle.

As the nozzle moves in the axial direction, cold water pressure at an inlet formed on the nozzle keeps consistent with cold water pressure at the cold water inlet on the valve body.

The length of the second portion is smaller than the length of the first portion, and the length of the first portion is the sum of the length of the inlet of the nozzle in the axial direction of the needle plus the axial stroke length of the nozzle.

Each water volume regulating switch comprises a base mounted on the water mixer body, a spool in coordination with the base for adjusting flow rate of cold water or hot water, and a handle for driving the spool to rotate, and each base is communicated with the cold water port or the hot water port through a communicating pore, respectively.

A side wall of the base has a water flow intake thereon and adapted for being communicated with an outside water supply pipe, the spool has a water flow adjusting opening, and the water flow intake corresponds to the water flow adjusting opening in the axial direction.

The pipeline of the shower assembly comprises a straight pipe and a curved pipe interconnected through a connector, the straight pipe is adapted for being communicated with the mixed water outlet directly or indirectly, and the sprinkler head is connected to the curved pipe so as to be downward.

The pipeline further has a fixing member disposed thereon, for fastening the pipeline onto a wall body.

The aforementioned jet shower device provided in the present invention has the following technical effects:

1. In the jet shower device provided in the present invention, a needle is mounted inside a nozzle, a cold water inflow space and a jetting cold water outlet are both formed between the nozzle and the needle, a hot water inflow space is formed between the nozzle and a valve body, a cold water inlet is communicated with the cold water port and the cold water inflow space respectively, and a hot water inlet is communicated with the hot water port and the hot water inflow space respectively, during usage, simultaneous adjusting of the cold water inflow space, the hot water inflow space and the jetting cold water outlet is achieved by adjusting the nozzle to make it move along the axial direction of the jet injection valve, specifically: when the nozzle moves to cause the cross-sectional area of the cold water inflow space to decrease, the cross-sectional area of the hot water inflow space increases correspondingly, so as to achieve adjusting of the temperature of mixed water by simpler operation, more importantly, when the cross-sectional area of the cold water inflow space decreases, the cross-sectional area of the jetting cold water outlet also decreases, so as to ensure that when the proportion of cold water is relatively small, there is still relatively high water pressure kept inside the nozzle, which has better jetting effect. Thus, the technical solution of the present invention achieves better jetting effect through a simpler mode of operation.

2. The jet shower device provided in the present invention further comprises a rotatable member rotatably disposed in the valve body in a sealing manner, and the rotatable member is connected with the needle to drive the needle to rotate therewith; the nozzle forms an axial movable adaptation with the rotatable member via an axial movement adjusting means; the nozzle coordinates with the valve body through a rotation limiting part, so as to prevent the nozzle from rotating relative to the valve body as the rotatable member drives the needle to rotate, and via the axial movement adjusting means to allow the nozzle to move in the axial direction of the needle relative to the valve body. During usage, it only needs to rotate the rotatable member in order to drive the needle to rotate therewith, and as the axial movement adjusting means is provided between the needle and the nozzle, and the nozzle is constrained within the valve body by the rotation limiting part and thus is unable to relatively rotate, during the rotation process of the needle, via the adjusting of the axial movement adjusting means, the nozzle will move axially along the needle, so that, by simultaneous adjusting of the cold water inflow space, the hot water inflow space and the jetting cold water outlet through the nozzle, the delicate design achieves simple operation.

3. In the jet shower device provided in the present invention, the valve body of the jet injection valve is communicated with a throat tube at the front end along the jetting direction of cold water, and the throat tube is communicated with a smaller open end of an expansion tube with variable diameters, so that the cold water has higher velocity but lower pressure when jetting out from the jetting cold water outlet along the front end of the needle, and at that time, negative pressure is formed at the part of the throat tube communicated with the hot water inflow space, so as to pump in hot water, and sufficient mixing of cold water and the hot water pumped in is ensured by the installation of the throat tube; the internal diameter of the throat tube is 5~14 mm, the length of the throat tube is within 5~8 times its internal diameter, an expansion angle formed by extension lines of an outer wall of the expansion tube and an outer wall of the throat tube is 5°~15°, the throat tube achieves energy transfer at the same time of ensuring sufficient mixing of cold water and hot water, and by installing the expansion tube and choosing a suitable expansion angle for the throat tube, the velocity of the mixed water is converted into pressure, so as to achieve better water out flowing effect.

4. In the jet shower device provided in the present invention, the supporting member comprises a plurality of convex ribs evenly arranged circumferentially around the needle body and extending in its axial direction, each two adjacent convex ribs have one fluid passage formed therebetween. Each convex rib comprises a first portion and a second portion, wherein, the radial dimension of the first portion is smaller than the radial dimension of the second portion, and an external surface of the second portion coordinates with the internal cavity of the nozzle. The first portion is arranged towards an inlet of the nozzle, and its radial dimension is set to be smaller than that of the second portion in order to form a fluid passage by coordinating with the internal wall of the nozzle, thus to evenly guide the water at the inlet of the nozzle into the fluid passages formed by the convex ribs, so as to ensure that the sum of the cross-sectional areas of the fluid passages is larger than the jetting cross-sectional area of the jetting cold water outlet of the nozzle, and that the pressure of cold water does not incur loss before reaching the jetting cold water outlet of the nozzle, which leads to better jetting effect.

5. The jet shower device provided in the present invention comprises a needle used in the jet injection valve, wherein, a supporting member is arranged circumferentially around its needle body, so that when this needle is installed within the nozzle of the jet injection valve, the external surface of the supporting member coordinates with an internal wall of the nozzle so as to limit the position of the needle body, a fluid passage is formed on the supporting member, so that when the pressure of the fluid passing through the nozzle is relatively large or very large and the flow velocity of the fluid is unstable, it is achievable, without influencing the smooth flow of the fluid, to effectively prevent the needle from deviating from the jetting cold water outlet of the nozzle or oscillating axially because of the very large and asymmetrical axial pressure that it bears in the radial direction and thus negatively affecting the jetting effect of the nozzle.

6. The jet shower device provided in the present invention comprises a needle used in the jet injection valve, wherein, its supporting member comprises a plurality of convex ribs evenly arranged circumferentially around the needle body and extending along its axial direction, each two adjacent convex ribs have one fluid passage formed therebetween, so as to facilitate the flowing of the fluid, furthermore, each convex rib comprises a first rib portion and a second rib portion, and the radial dimension of the first rib portion is smaller than the radial dimension of the second rib portion, so as to be able to further enhance the jetting effect of the nozzle.

7. In the jet shower device provided in the present invention, when the nozzle moves along the axial direction, the cold water inlet on the valve body is arranged towards the inlet of the nozzle all along. As the cold water inlet on the valve body is arranged towards the inlet of the nozzle all along, under this circumstance, when the nozzle is moved along the axial direction, the opening size of the inlet of the nozzle keeps constant all along, and the water pressure at the inlet of the nozzle keeps consistent with the water pressure at the cold water inlet of the valve body all along, so as to ensure better jetting effect even when the proportion of cold water is relatively small.

BRIEF DESCRIPTION OF THE DRAWINGS

In order to make the content of the present invention clearly understood more easily, further detailed description of the present invention is provided below, with reference to the accompanying drawings, wherein.

EXPLANATION OF MARKINGS IN THE ACCOMPANYING DRAWINGS

A—water mixer body; A1—cold water port; A2—hot water port; a—base; a1—water flow intake; b—spool; b1—water flow adjusting opening; c—handle; B—jet injection valve; B1—cold water inlet; B2—hot water inlet; 1—valve body; 13—rotatable member; 3—nozzle; 31—pressurizing segment; 32—jetting cold water outlet; 33—rotation limiting part; 34—nozzle conical portion; 35—inlet; 4—needle; 41—needle body; 42—needle conical portion; 43—circular ring; 44—convex rib; 44*a*—first portion; 44*b*—second portion; 45—annular supporting board; 46—flow diversion hole; 48—clamping element; 5—fluid passage; 6—throat tube; 7—expansion tube; 8—hot water inflow space; 9—cold water inflow space; 15—pipeline; 16—sprinkler head; 17—fixing member; 151—straight pipe; 152—curved pipe.

DETAILED DESCRIPTION OF THE PREFERRED EMBODIMENTS

Detailed description of the technical solution of the present invention is provided as follows, in conjunction with the accompanying drawings and specific embodiments.
Embodiment 1

Figure 10:
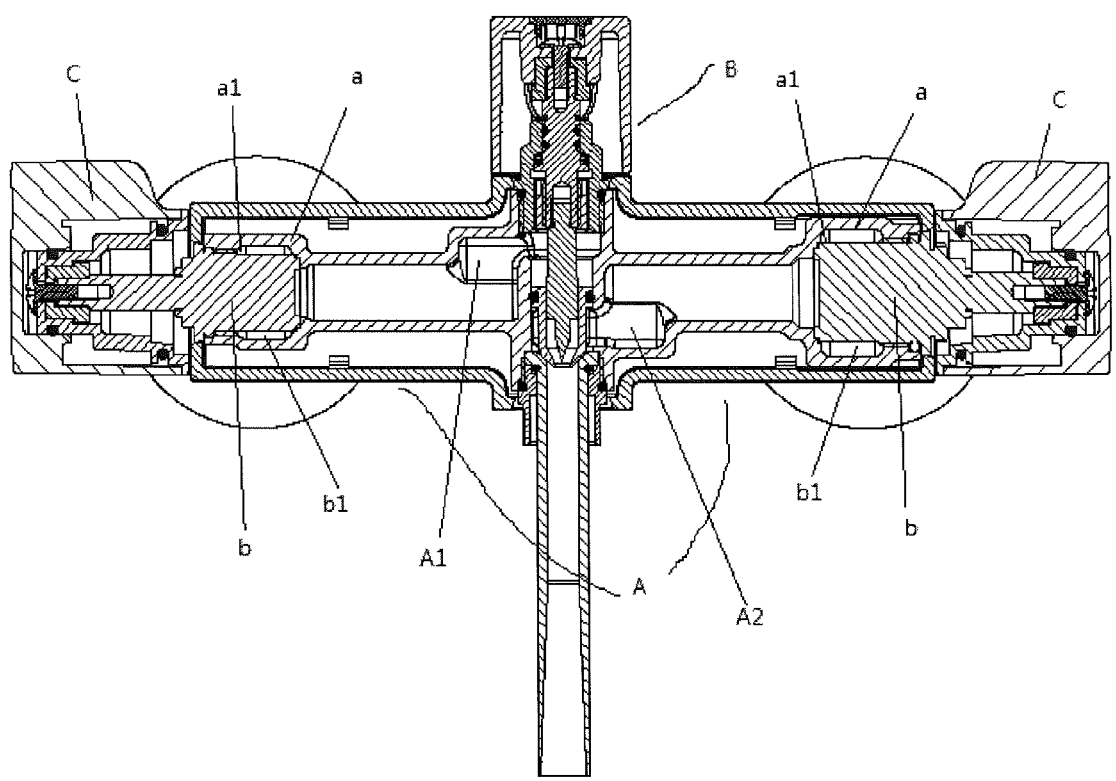
FIG. 10 is a cross-sectional view of the structure of the jet water mixer of the present invention.
Figure 11:
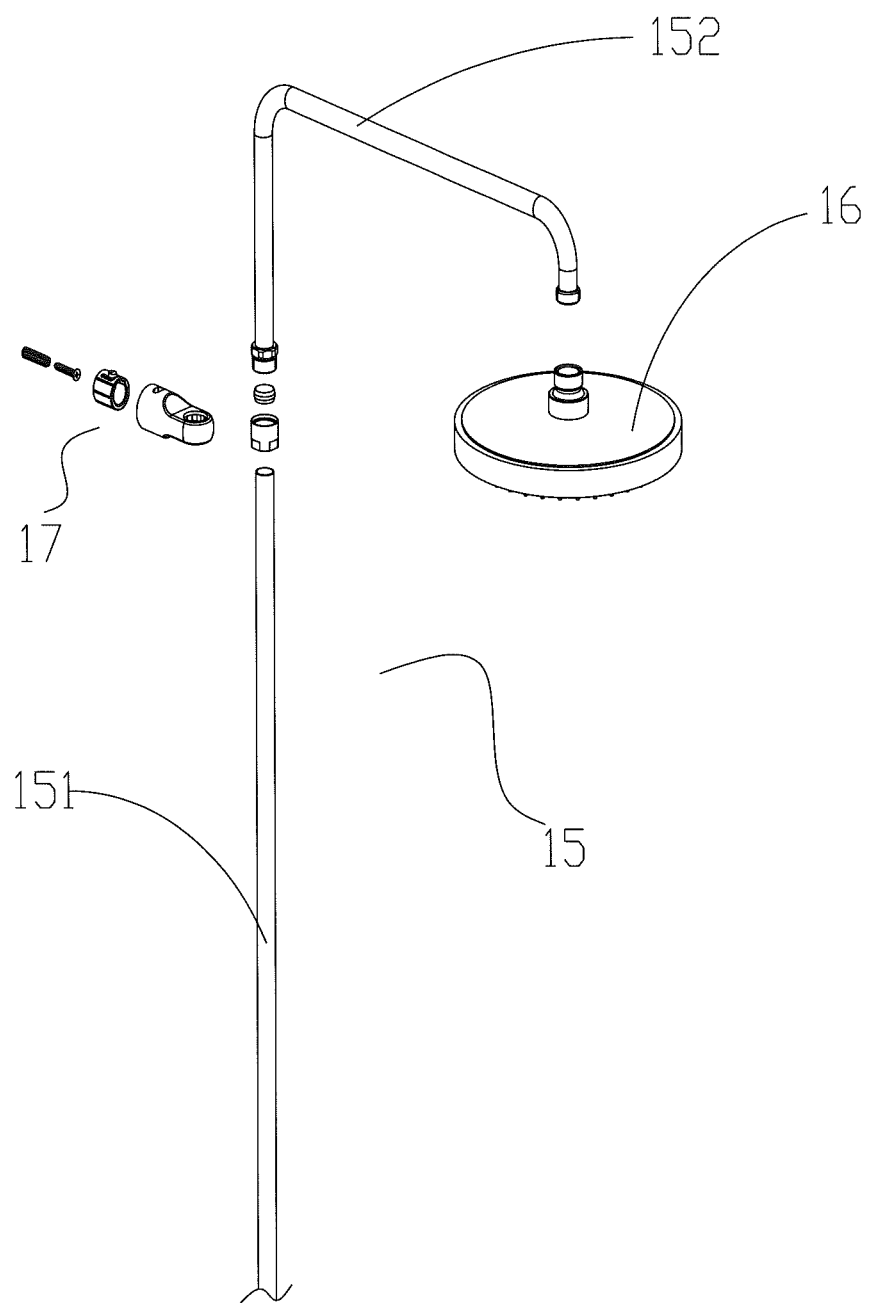
FIG. 11 is an exploded view of the stereo-structure of the shower assembly of the jet shower device of the present invention.

As shown in FIG. 10 and FIG. 11, this embodiment provides a jet shower device, comprising a water mixer body (A), a jet injection valve (B) and a shower assembly, wherein, the water mixer body (A) has a cold water port (A1), a hot water port (A2) and a mixed water outlet, the jet injection valve (B) has a cold water inlet (B1) and a hot water inlet (B2), the cold water port (A1) is communicated with the cold water inlet (B1), the hot water port (A2) is communicated with the hot water inlet (B2), the volumes of cold water and hot water that flow into the jet injection valve (B) are adjustable by adjusting the opening sizes of the cold water port (A1) and the hot water port (A2), respectively, and the shower assembly has a pipeline 15 communicated with the mixed water outlet of the water mixer body (A) and a sprinkler head 16 communicated with the pipeline 15.

In this embodiment, the opening size of the cold water port (A1) is adjustable through a cold water regulating switch, the opening size of the hot water port (A2) is adjustable through a hot water regulating switch, wherein, the cold water regulating switch and the hot water regulating switch of this embodiment have the same structure.

The cold water regulating switch (or the hot water regulating switch) comprises a base (a) mounted on the water mixer body (A), a spool (b) in coordination with the base (a), and a handle (c) for driving the spool (b) to rotate.

Figure 8:
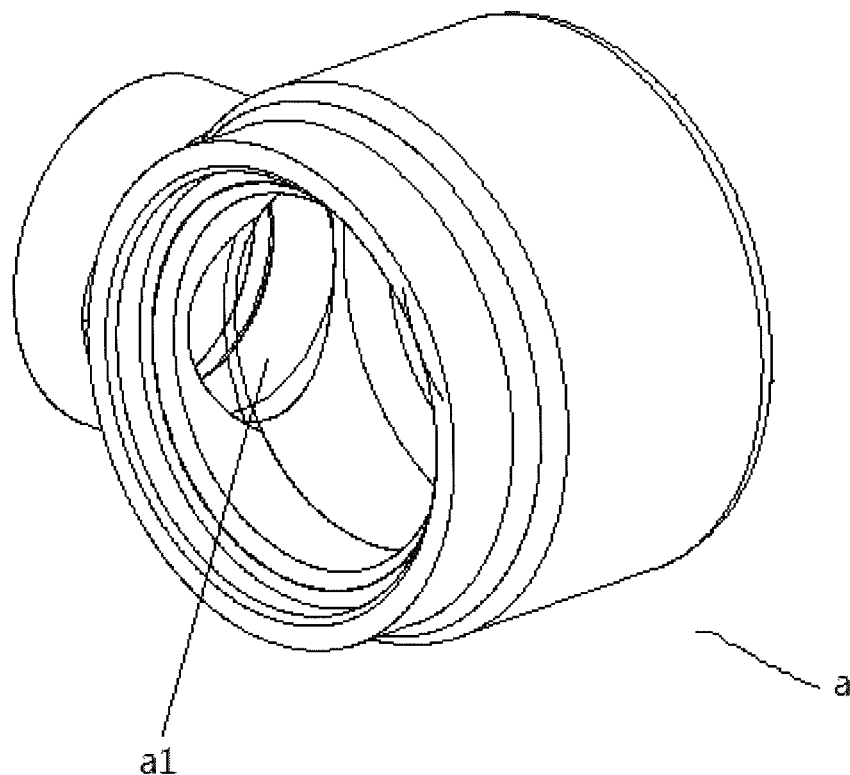
FIG. 8 is a stereo-structural schematic diagram of the base of the present invention.

As shown in FIG. 8, the base (a) is cylindrical, a communicating hole is provided within the base (a), the base (a) is communicated with the cold water port (A1) (or the hot water port (A2)) through the communicating hole, and the side wall of the base (a) has a water flow intake (a1) formed thereon to communicate with a cold water supply pipe.

Figure 9:
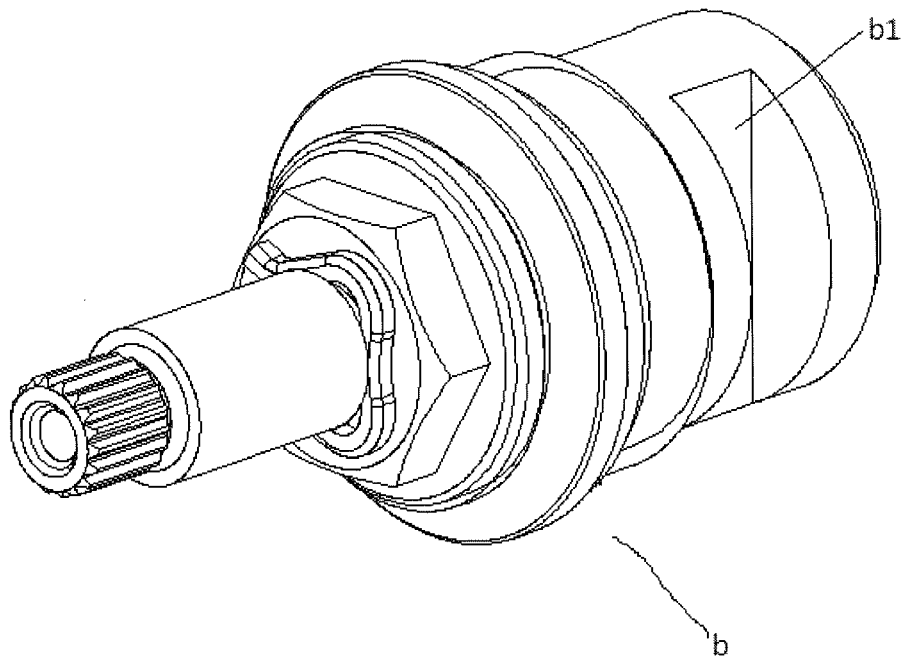
FIG. 9 is a stereo-structural schematic diagram of the ceramic spool of the present invention.

As shown in FIG. 9, the ceramic spool (b) comprises a cylindrical main body, the side wall of the cylindrical main body has a cold water adjusting opening (b1) formed thereon, and is provided with a polygonal clamping part and a threaded connecting part, during installation, one end of the spool (b) is inserted into the base (a) so as to allow the water flow adjusting opening (b1) of the spool (b) to correspond to the water flow intake (a1) of the base (a) in the axial direction, this end of the spool (b) is clamped onto the edge of the side wall of the base (a) through the polygonal clamping part, and the other end of the spool (b) is inserted into the handle (c) so as to be secured to the handle (c) through a screw bolt engaged with the screw thread inside an axial groove of the spool (b).

During usage, the handle (c) is rotated, which drives the spool (b) to rotate and thus drives the water flow adjusting opening (b1) on the spool (b) to rotate, so as to change the overlapping size of the openings of the water flow adjusting opening (b1) and the water flow intake (a1) on the base (a), wherein, when the water flow adjusting opening (b1) and the water flow intake (a1) correspond to each other completely, the volume of cold water flowing into the water mixer body (A) is maximal, so as to allow the volume of cold water flowing from the cold water port (A1) to the jet injection valve (B) to be maximal, and when the water flow adjusting opening (b1) and the water flow intake (a1) are staggered from each other completely, the water flow intake (a1) is closed and thus unable to import cold water into the water mixer body (A).

The spool (b) may be a ceramic spool, a lift spool, or other forms of spool.

The principle of hot water adjusting is identical with the principle of cold water adjusting as described above.

Detailed description of the structure of the jet injection valve (B) of the jet shower device is provided below, with reference to the accompanying drawings.

Figure 1:
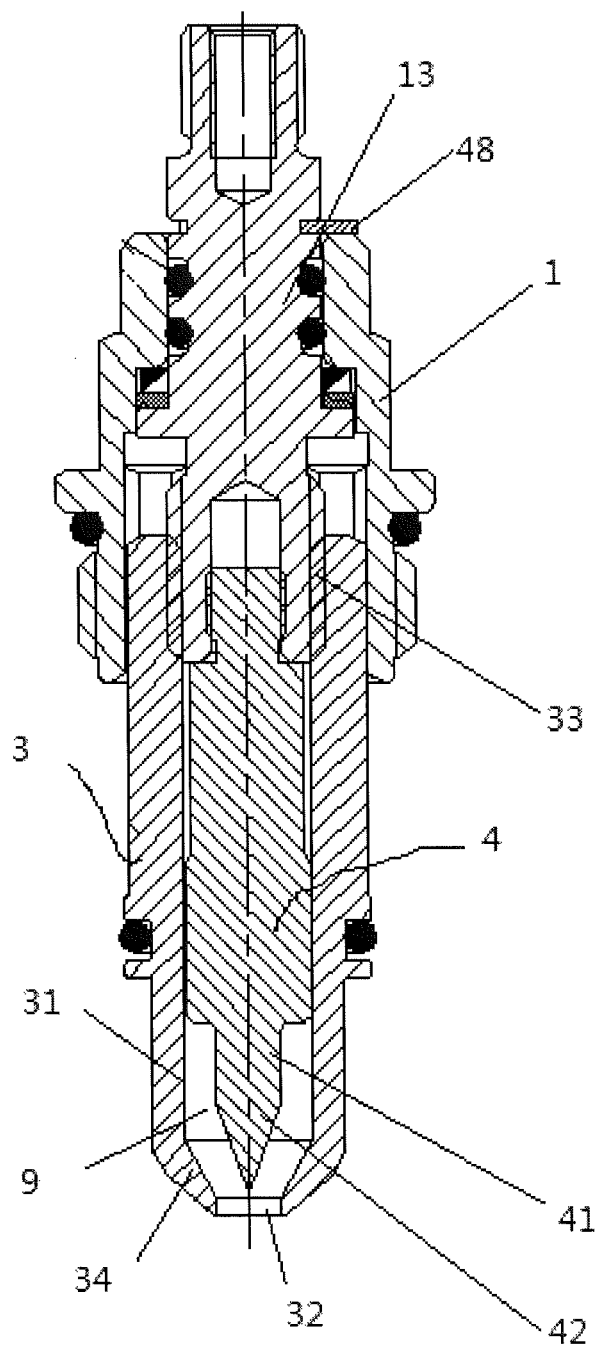
FIG. 1 is a structural schematic diagram of the valve spool of Embodiment 1, formed by coordination of the nozzle, the needle and the rotatable member.

In this embodiment, as shown in FIG. 1, the jet injection valve (B) has a valve body 1, a rotatable member 13, a nozzle 3, a needle 4, a throat tube 6, an expansion tube 7 and a water outlet. The valve body 1 is a shell with a hollow cavity, wherein, the nozzle 3, the needle 4 and the rotatable member 13 are provided inside the hollow cavity of the valve body 1, and a cold water inlet (B1) and a hot water inlet (B2) are formed on the side wall of the valve body 1.

The rotatable member 13 is rotatably disposed on the valve body 1 in a sealing manner, and an axial movement adjusting means forms an axial movable adaptation with the nozzle 3 and allows a rotating movement of the rotatable member 13 to be converted into an axial movement of the nozzle 3.

Specifically, for example, the axial movement adjusting means may be a rack and a gear engaged therewith for transmitting a driving force, i.e. the rack is provided on the nozzle 3, and the rotatable member 13 is in mechanical linkage with the gear to drive an axial movement of the nozzle 3.

As shown in FIG. 1, the rotatable member 13 comprises a cylinder and a rotary knob provided on one end of the cylinder, wherein, the cylinder has an axial recess provided in its axial direction and a radial recess, when mounting the rotatable member 13 inside the valve body 1, the rotary knob extends to the outside of the valve body 1, the upper outside wall of the valve body is attached to the radial recess, and a clamping element 48 is mounted into the radial recess, so as to mount the rotatable member 13 inside the valve body 1 and prevent it from moving axially relative to the valve body 1. Besides, external screw thread is provided on the rotatable member 13.

Figure 2:
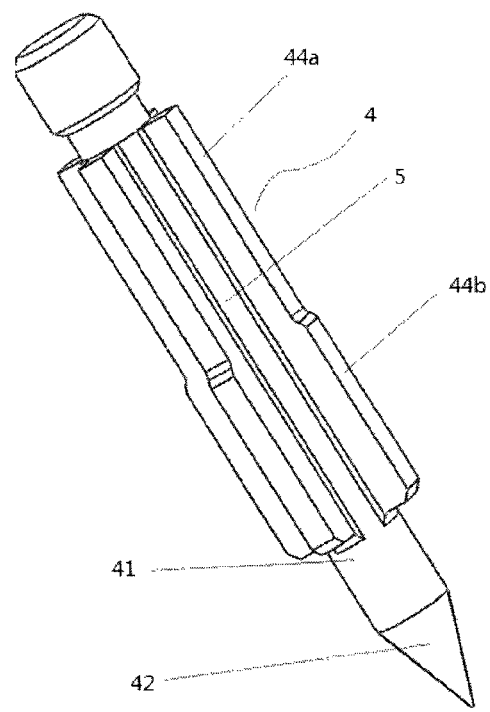
FIG. 2 is a structural schematic diagram of the needle of Embodiment 1.

As shown in FIG. 2, the needle 4 has a cylindrical needle body 41, one end of the cylindrical needle body 41 is inserted into the axial recess of the rotatable member 13 to allow the needle 4 to be able to rotate together with the rotatable member 13 without generating any rotary displacement relative to the rotatable member 13, a needle conical portion 42 is formed on the other end of the needle body 41, the diameter of the needle conical portion 42 decreases linearly from its root to its jet injection tip, so as to ensure the effect of linear jetting, the conical angle of the needle conical portion 42 is 10°~150°, the conical angle of the nozzle conical portion 34 is larger than or equal to the conical angle of the needle conical portion 42, the larger end of the needle conical portion 42 is connected on the needle body 41, a plurality of convex ribs 44 are evenly arranged circumferentially around the needle body 41 to form a supporting member, the convex ribs 44 extend in the axial direction of the needle body 41, the convex rib 44 comprises a first portion 44a and a second portion 44b, wherein, the first portion 44a is arranged towards a nozzle cold water inlet of the nozzle, and its radial dimension is smaller than the radial dimension of the second portion 44b, so as to form a fluid passage 5 by coordinating with the internal cavity wall of the nozzle, and an external surface of the second portion 44b coordinates with the internal cavity of the nozzle 3. In this embodiment, the radial dimension of the second portion 44b is triple the radial dimension of the first portion 44a, and with the first portion 44a smaller than the second portion 44b, the fluid passage is formed on the supporting member. The axial length of the second portion 44b is smaller than the axial length of the first portion 44a, and the axial length of the first portion 44a is the sum of the length of the inlet 35 of the nozzle 3 in the axial direction of the needle 4 plus the axial stroke length of the nozzle 3.

Figure 3:
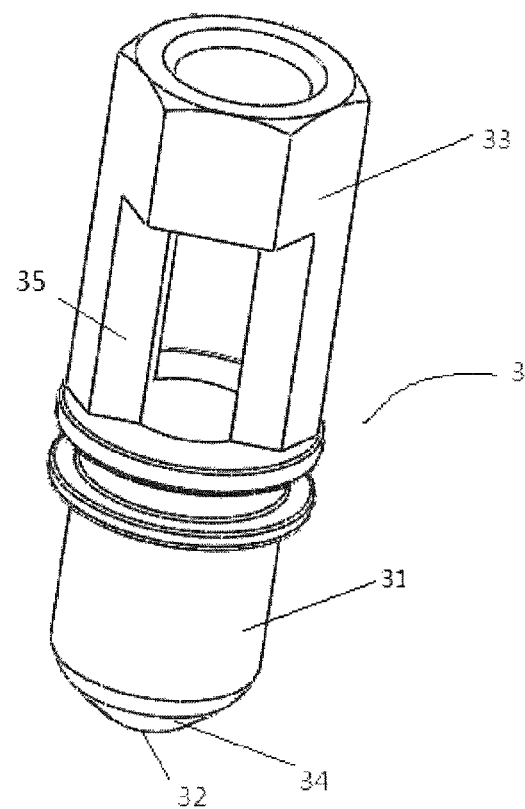
FIG. 3 is a structural schematic diagram of the nozzle of Embodiment 1.

As shown in FIG. 3, the nozzle 3 comprises a cylindrical main body with inner cavity, an inlet 35 for cold water to flow in is formed on the side wall of the cylindrical main body, one end of the cylindrical main body is directly formed into a hexagon nut with inner cavity, when mounting the nozzle 3 inside the valve body 1, the edges of the hexagon nut are clamped on the internal wall of the valve body 1, so as to prevent the nozzle 3 from rotating relative to the valve body 1, therefore, the hexagon nut serves as a rotation limiting part 33 which limits the relative rotation of the nozzle 3, nozzle conical portion 34 is formed on the other end of the cylindrical main body, and the smaller open end of the nozzle conical portion 34 serves as the jetting cold water outlet 32, whose opening diameter is 3~10 mm, preferably 4~6 mm. In addition, internal screw thread is also formed on the nozzle 3, and when the nozzle 3 is mounted inside the valve body 1, a screw-thread fit is formed between the internal screw thread on the nozzle 3 and the external screw thread on the rotatable member 13.

Figure 4:
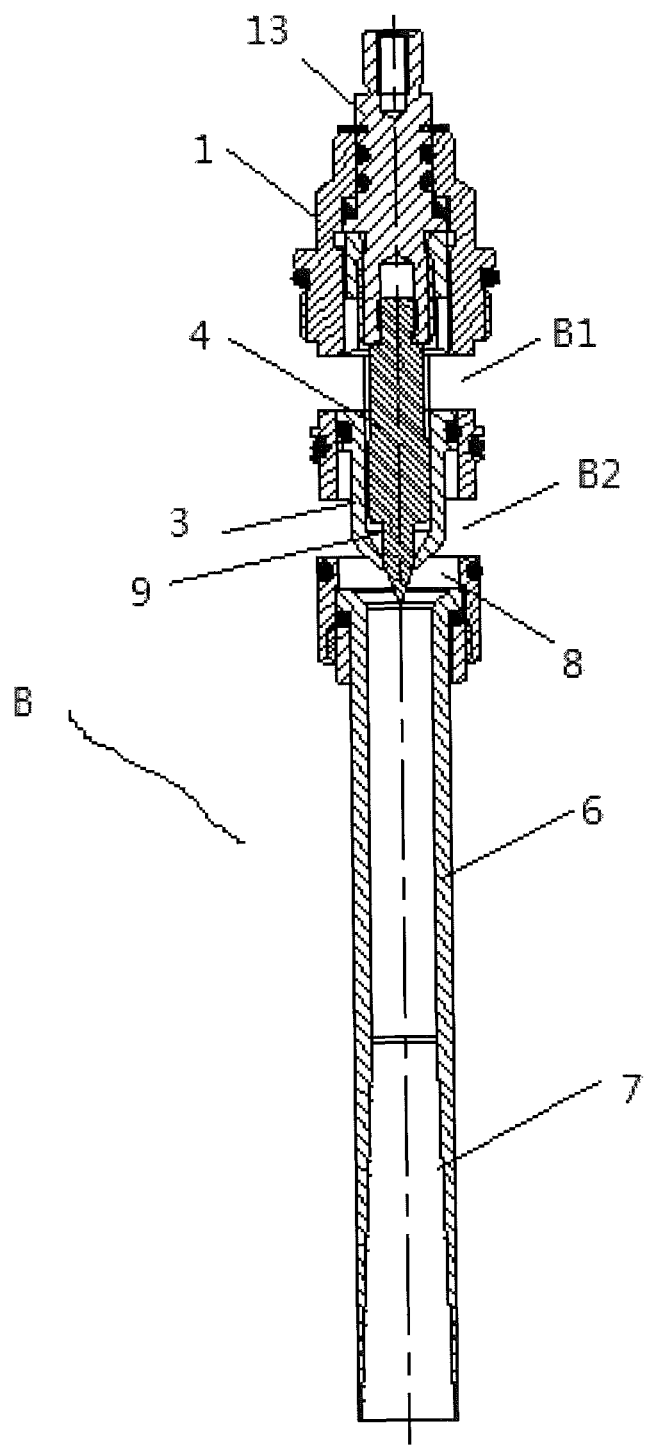
FIG. 4 is a structural schematic diagram of the jet injection valve of Embodiment 1.

As shown in FIG. 4, the jet injection valve (B) also comprises a throat tube 6 mounted onto the valve body 1, which extends in the jetting direction of cold water, the throat tube 6 is placed a distance away from the jetting cold water outlet 32, and this distance is smaller than or equal to the stroke length of the screw-thread fit between the internal screw thread on the nozzle 3 and the external screw thread on the rotatable member 13. The throat tube 6 is further communicated with a smaller open end of an expansion tube 7 with variable diameters, the internal diameter of the throat tube 6 is 5~14 mm, preferably 6~10 mm, the length of the throat tube 6 is within 5~8 times its internal diameter, and an expansion angle formed by extension lines of an outer wall of the expansion tube 7 and an outer wall of the throat tube 6 is 5°~15°.

Figure 5:
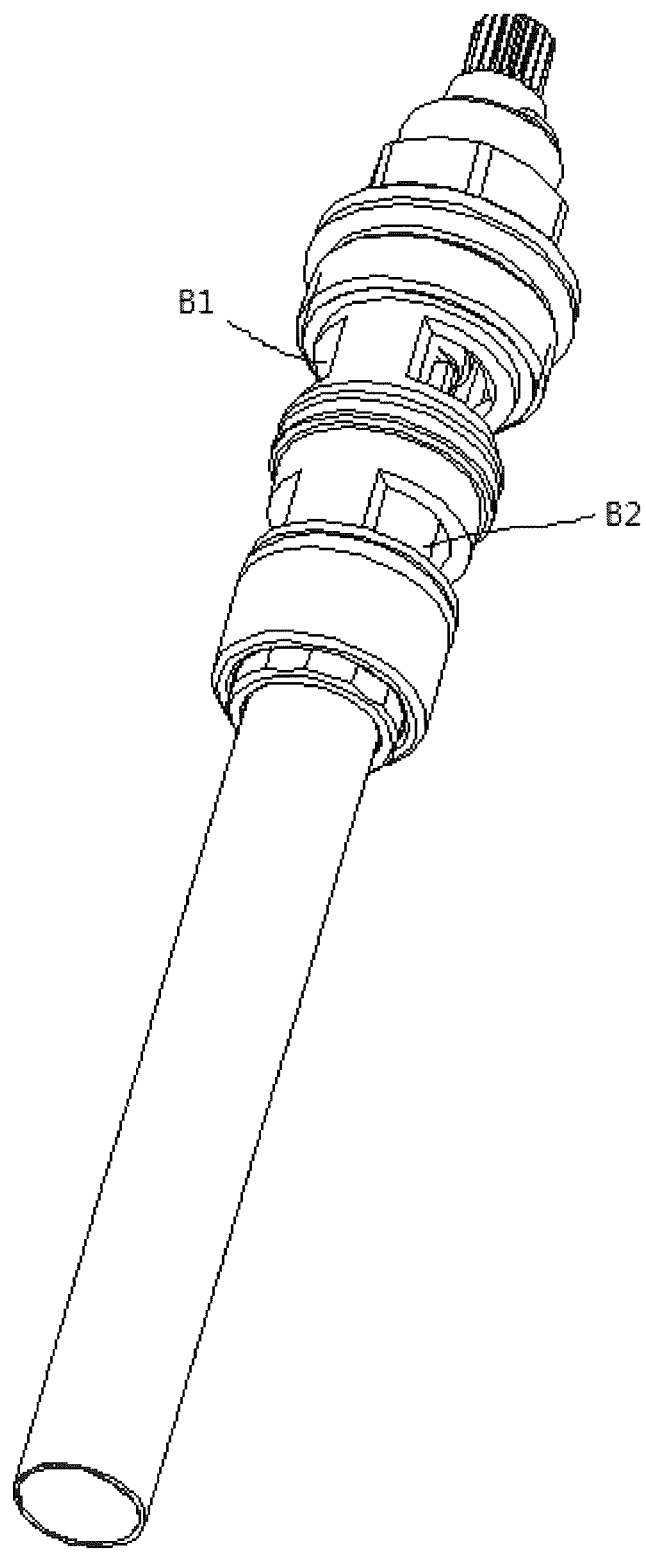
FIG. 5 is a stereo-structural schematic diagram of the jet injection valve of Embodiment 1.

During installation, the valve body 1 is sleeved outside the nozzle 3, the rotation limiting part 33 of the nozzle 3 is clamped on the internal wall of the valve body 1, so as to prevent the nozzle 3 from rotating relative to the valve body 1, and the inlet 35 of the nozzle 3 is in correspondence with the cold water inlet (B1) of the valve body 1; then, the needle body 41 of the needle 4 is inserted into the axial recess of the rotatable member 13, so as to allow the needle 4 to be able to rotate together with the rotatable member 13; subsequently, the rotatable member 13 and the needle 4 that have been mounted together are inserted into the inner cavity of the nozzle 3 inside the valve body 1, and a screw-thread fit is formed between the internal screw thread on the nozzle 3 and the external screw thread on the rotatable member 13, so as to form the jet injection valve spool as shown in FIG. 1; finally, the throat tube 6 and the expansion tube 7 are mounted onto the valve body 1, so as to form the jet injection valve (B) as shown in FIG. 4 and FIG. 5.

As shown in FIG. 4, the jet injection valve (B) comprises a valve body 1, a nozzle 3, a needle 4, a throat tube 6, an expansion tube 7 and a water outlet. A cold water inlet (B1) and a hot water inlet (B2) are formed on the valve body 1, the nozzle 3 is mounted inside the valve body 1 and is clamped on the internal wall of the valve body 1 through the rotation limiting part 33, and after forming a coordination with the rotatable member 13, the needle 4 is inserted into the nozzle 3, so as to form a screw-thread fit between the internal screw thread on the nozzle 3 and the external screw thread on the rotatable member 13, also, a cold water inflow space 9 and a jetting cold water outlet 32 are both formed between the nozzle 3 and the needle 4, a hot water inflow space 8 is formed between the nozzle 3 and the valve body 1, the cold water inlet (B1) is communicated with the cold water port (A1) and the cold water inflow space 9 respectively, the hot water inlet (B2) is communicated with the hot water port (A2) and the hot water inflow space 8 respectively, and the inlet 35 of the nozzle 3 corresponds to the cold water inlet (B1) of the valve body 1.

During usage, by turning the rotatable member 13, the needle 4 is driven to rotate together with the rotatable member 13, and because, on one hand, the nozzle 3 is clamped inside the valve body 1 through the rotation limiting part 33 so as not to be able to rotate, and on the other hand, the nozzle 3 forms a screw-thread fit with the external screw thread on the rotatable member 13 through its internal screw thread, so that the nozzle 3 is able to move in the axial direction of the valve body 1, when turning the rotatable member 13, thereby simultaneously changing the cross-sectional areas of the cold water inflow space 9, the hot water inflow space 8 and the jetting cold water outlet 32; during this process, the inlet 35 of the nozzle 3 always corresponds to the cold water inlet (B1), i.e. during the axial moving process of the nozzle 3, cold water pressure at the inlet 35 always keeps consistent with cold water pressure at the cold water inlet (B1) on the valve body 1.

In order to ensure better jetting effect, in this embodiment, between the supporting member of the needle body 41 and the needle conical portion 42 there is a pressurizing segment 31, the pressurizing segment 31 coordinates with the internal wall of the nozzle 3 to form the cold water inflow space 9, the pressurizing segment 31 is cylindrical, with a diameter larger than or slightly smaller than the diameter of the jetting cold water outlet 32 of the nozzle 3. The expression "larger than" here refers to that, after the needle conical portion 42 completely coordinates with the jetting cold water outlet 32, the jetting cold water outlet 32 is completely sealed, so as to prevent cold water from jetting out of the jetting cold water outlet 32. The expression "slightly smaller than" here refers to that, the diameter of the pressurizing segment 31 and the diameter of the jetting cold water outlet 32 have a slight difference value when compared to each other, i.e. after the needle conical portion 42 completely coordinates with the jetting cold water outlet 32, there is a slight gap between the outer circumferential surface of the pressurizing segment 31 and the inner circumferential surface of the jetting cold water outlet 32, and although a slight amount of cold water jets out of the jetting cold water outlet 32 through this gap, its slight influence on the hot water that flows by the outer wall of the nozzle 3 is negligible. The diameter of the needle conical portion 42 gradually decreases in the jetting direction, and its length is less than or equal to the movable stroke length of the nozzle 3.

With respect to the jet shower device of the present invention, the choosing of parameters of its respective components has significant influence on the hot water pumping effect of the jet shower device, and it is proven by experiments that the entire structure of the jet shower device of Embodiment 1 in conjunction with the specific parameters enable the device to have very good pumping effect by negative pressure even when the cold water amount is relatively small, as indicated by the detailed testing results listed in Table 1, while Table 2 indicates that, when the device is adjusted to intermediate state of cold water, the entire structure of the jet water mixer of Embodiment 1 in conjunction with the specific parameters also enable the device to have very good pumping effect by negative pressure during usage.

TABLE 1

| Testing condition 1 Pressure at the cold water inlet (Mpa) | Minimal state of cold water Negative pressure for hot water pumping (meter water column) |
| --- | --- |
| 0.05 | −0.26 |
| 0.1 | −0.47 |
| 0.15 | −0.7 |
| 0.2 | −1 |

TABLE 2

| Testing condition 2 Pressure at the cold water inlet (Mpa) | Intermediate state of cold water Negative pressure for hot water pumping (meter water column) |
| --- | --- |
| 0.05 | −0.63 |
| 0.1 | <−1 |

Embodiment 2

Figure 7:
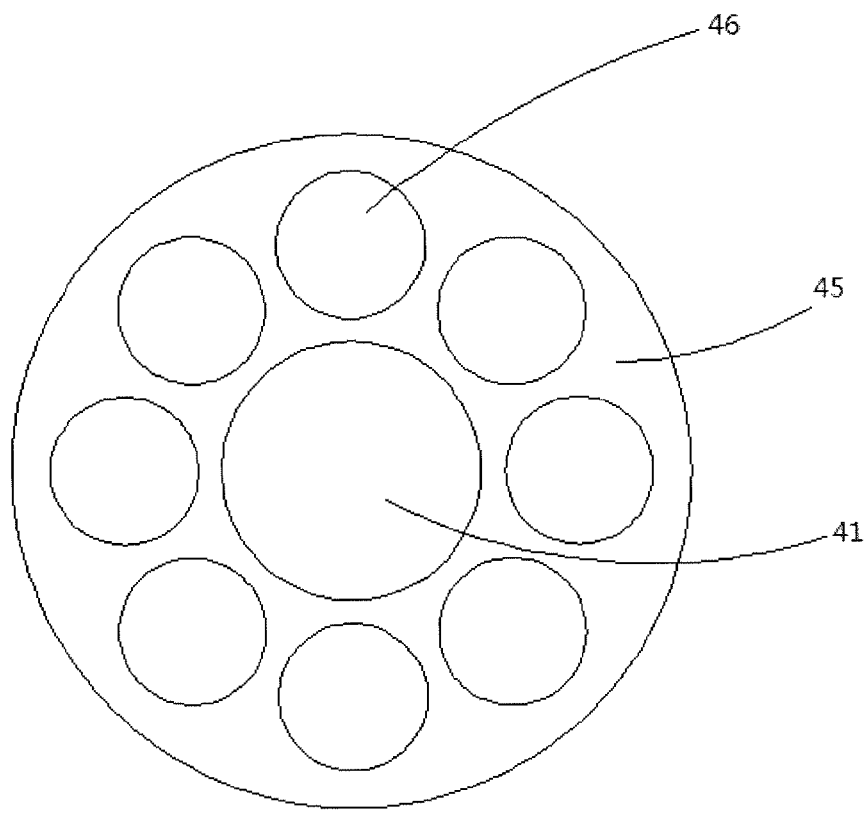
FIG. 7 is a structural schematic diagram of the supporting member on the needle of Embodiment 2.

As shown in FIG. 7, this embodiment provides an improved jet shower device based on Embodiment 1, and the improvement mainly focuses on the fact that the supporting member of the needle 4 employs a different structure. In this embodiment, the supporting member is an annular supporting board 45 formed on the needle body 41, and the annular supporting board 45 is provided with a plurality of flow diversion holes 46 formed thereon and serving as the fluid passage 5. This configuration enables fluent inflow of cold water, and is able to symmetrically support the needle 4.

Embodiment 3

Figure 6:
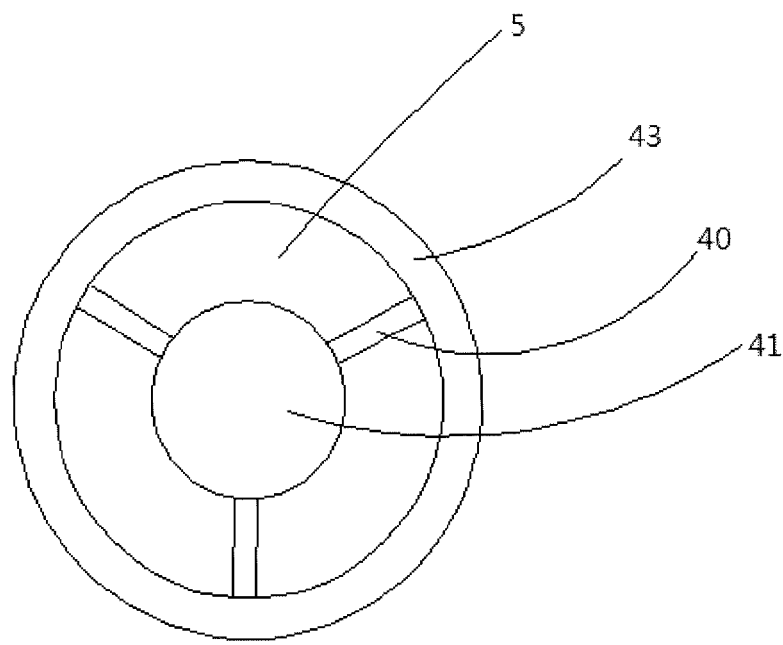
FIG. 6 is a structural schematic diagram of the supporting member on the needle of Embodiment 3.

As shown in FIG. 6, this embodiment provides an improved jet shower device based on Embodiment 1, and the improvement mainly focuses on the fact that the supporting member of the needle 4 employs a different structure. In this embodiment, the supporting member is a circular ring 43, the circular ring 43 is connected on the needle body 41 through a plurality of rib strips 40, and each two adjacent rib strips 40 have one fluid passage 5 formed therebetween. This configuration not only ensures fluent inflow of cold water, but also is able to symmetrically support the needle 4.

Embodiment 4

This embodiment provides an improved jet shower device based on Embodiment 1, and the improvement mainly focuses on the fact that the rotation limiting part 33 on the nozzle 3 employs a different structure. In this embodiment, the rotation limiting part 33 is a convex member formed on the circumferential surface of one end of the nozzle 3, and a guide groove in the axial direction for slidably coordinating with the convex member is formed on the inner wall of the valve body 1.

Embodiment 5

This embodiment provides an improved jet shower device based on Embodiment 1, and the improvement mainly focuses on the fact that the rotation limiting part 33 on the nozzle 3 employs a different structure. In this embodiment, the rotation limiting part 33 is a convex member formed on the inner wall of the valve body 1, and a guide groove in the axial direction for slidably coordinating with the convex member is formed on one end of the nozzle 3.

As shown in FIG. 11, the pipeline 15 of the shower assembly comprises a straight pipe 151 and a curved pipe 152 interconnected through a connector such as a red copper bushing and a fixing nut, the straight pipe 151 is adapted for being communicated with the mixed water outlet directly or indirectly, i.e. the straight pipe 151 and the mixed water outlet may have a switching valve as described below connected therebetween, and the sprinkler head 16 is connected to the curved pipe 152 so as to be downward.

Optionally, the straight pipe 151 and the expansion tube 7 with variable diameters may be interconnected through a connector such as a red copper bushing and a fixing nut.

In addition, during actual usage, this shower assembly may be fastened onto a wall body as required, i.e. the pipeline 15 further has a fixing member 17 disposed thereon, for fastening the pipeline 15 onto a wall body, specifically as shown in FIG. 11, this fixing member 17 comprises a fixing base and an expansion sleeve joined together, as well as a cross-shaped automatic screw bolt.

The pipeline 15 and the jet water mixer (A) may be communicated with each other directly, or a switching valve (not shown in the drawing) may be added between them, the inlet of the switching valve is communicated with the jet water mixer (A), and the outlet of the switching valve is communicated with the pipeline 15, and the side outlet of the switching valve is communicated with a hose and subsequently communicated with a handheld spray head, during usage, by turning the handle of the switching valve, water outflow can be switched between the sprinkler head 16 and the handheld spray head.

The structure of the switching valve may be a ball valve, a ceramic valve spool, a lift valve spool, etc.

In addition, in order to achieve better water outflow effect, the cross-sectional areas of the inner bore of the sprinkler head 16, the pipeline 15, the connector such as the red copper bushing, and the switching valve are configured to be larger than the cross-sectional area of the inner bore of the throat tube 6, optimally larger than the cross-sectional area of the water outlet of the expansion tube 7.

Obviously, the aforementioned embodiments are merely intended for clearly describing the examples, rather than limiting the implementation scope of the invention. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the scope of protection of the present invention.

What is claimed is:

1. A jet shower device, comprising:
   a water mixer body, having a cold water port, a hot water port and a mixed water outlet;
   a jet injection valve, having a valve body with a cold water inlet and a hot water inlet formed thereon and with a nozzle and a needle disposed therein, and further having a jetting cold water outlet formed on said nozzle, a cold water inflow space formed between an internal surface of said nozzle and an external surface of said needle, and a hot water inflow space formed between an external surface of said nozzle and an internal surface of said valve body; and
   a shower assembly, having a pipeline communicated with said mixed water outlet of said water mixer body, and a sprinkler head communicated with said pipeline;
   wherein,
   opening dimensions of said cold water port and said hot water port are adjustable respectively through a water volume regulating switch;
   said needle is mounted inside said nozzle, said cold water inlet is communicated with said cold water port and said cold water inflow space respectively, said hot water inlet is communicated with said hot water port and said hot water inflow space respectively;
   said needle is unmovable in the axial direction of said needle, while said nozzle is movable along the axial direction of said needle; and
   said cold water inflow space, said hot water inflow space and said jetting cold water outlet are simultaneously adjustable by adjusting the position of said nozzle in the axial direction of said needle.

2. The jet shower device of claim 1, wherein, further comprising a rotatable member, rotatably disposed on said valve body in a sealing manner, and an axial movement adjusting means forming an axial movable adaptation with said nozzle and allowing a rotating movement of said rotatable member to he converted into an axial movement of said nozzle.

3. The jet shower device of claim 2, wherein, said rotatable member is connected with said needle to drive said needle to rotate therewith;
   said valve body coordinates with said nozzle through a rotation limiting part, so as to prevent said nozzle from rotating relative to said valve body as said rotatable member drives said needle to rotate, and via said axial movement adjusting means to allow said nozzle to move in the axial direction of said needle relative to said valve body.

4. The jet shower device of claim 2, wherein, said water outlet of said valve body is communicated with a throat tube, said throat tube is communicated with a smaller open end of an expansion tube with variable diameters, said expansion tube is communicated with said pipeline.

5. The jet shower device of claim 4, wherein, the internal diameter of said throat tube is 5-14 mm, the length of said throat tube is within 5-8 times its internal diameter.

6. The jet shower device of claim 5, wherein, the internal diameter of said throat tube is 6-10 mm.

7. The jet shower device of claim 4, wherein, an expansion angle formed by extension lines of an outer wall of said expansion tube and an outer wall of said throat tube is 5°-15°.

8. The jet shower device of claim 4, wherein, said axial movement adjusting means comprises an internal thread formed on said nozzle, and an external thread formed on said rotatable member and engaged with said internal thread, wherein, the stroke length of the screw- thread fit of said internal thread and said external thread is larger than or equal to the distance from the jetting cold water outlet of said nozzle to said throat tube.

9. The jet shower device of claim 3, wherein, said rotation limiting part comprises a polygonal end portion formed on said nozzle, and the shape of the internal wall of said valve body matches with that of said polygonal end portion.

10. The jet shower device of claim 1, wherein, said nozzle has a nozzle conical portion, and a smaller open end of said nozzle conical portion forms said jetting cold water outlet.

11. The jet shower device of claim 1, wherein, said needle has a needle body, and a needle conical portion formed on one end portion of said needle body.

12. The jet shower device of claim 11, wherein, the conical angle of said needle conical portion is 10°-150°.

13. The jet shower device of claim 12, wherein, the conical angle of said nozzle conical portion is larger than or equal to that of said needle conical portion.

14. The jet shower device of claim 11, wherein, further comprising a supporting member arranged circumferentially around said needle body, said supporting member coordinates with an internal wall of said nozzle so as to support said needle through said nozzle, and a fluid passage is formed on said supporting member.

15. The jet shower device of claim 14, wherein, said supporting member comprises a plurality of convex ribs evenly arranged circumferentially around said needle body and extending in its axial direction, each two adjacent convex ribs have one said fluid passage formed therebetween, and the sum of the cross-sectional areas of said fluid passages is larger than the jetting cross-sectional area of the nozzle cold water outlet.

16. The jet shower device of claim 15, wherein, each said convex rib comprises a first portion and a second portion, and said first portion is arranged towards a nozzle cold water inlet of said nozzle, and its radial dimension is smaller than the radial dimension of said second portion, so as to form said fluid passage by coordinating with an internal cavity wall of the nozzle, and an external surface of said second portion coordinates with said internal cavity of said nozzle.

17. The jet shower device of claim 1, wherein, as said nozzle moves in the axial direction, cold water pressure at an inlet formed on said nozzle keeps consistent with cold water pressure at said cold water inlet on said valve body.

18. The jet shower device of claim 17, wherein, the length of said second portion is smaller than the length of said first portion, and the length of said first portion is larger than or equal to the sum of the length of said inlet of said nozzle along the axial direction of said needle plus the axial stroke length of said nozzle.

19. The jet shower device of claim 1, wherein, each said water volume regulating switch comprises a base mounted on said water mixer body, a spool in coordination with said base for adjusting flow rate of cold water or hot water, and a handle for driving said spool to rotate, and each said base is communicated with said cold water port or said hot water port through a communicating hole, respectively.

20. The jet shower device of claim 19, wherein, a side wall of said base has a water flow intake thereon and adapted for being communicated with an outside water supply pipe, said spool has a water flow adjusting opening, and said water flow intake corresponds to said water flow adjusting opening in the axial direction.

\* \* \* \* \*